United States Patent
Hong et al.

(10) Patent No.: US 8,385,311 B2
(45) Date of Patent: Feb. 26, 2013

(54) HIERARCHICAL RANDOM ACCES METHOD FOR WIRELESS COMMUNICATION SYSTEM HAVING SIGNIFICANTLY LARGE CELL

(75) Inventors: Tae Chul Hong, Daejeon (KR); Hee Wook Kim, Daejeon (KR); Kunseok Kang, Daejeon (KR); Do-Seob Ahn, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 759 days.

(21) Appl. No.: 12/548,790

(22) Filed: Aug. 27, 2009

(65) Prior Publication Data

US 2010/0135274 A1 Jun. 3, 2010

(30) Foreign Application Priority Data

Dec. 3, 2008 (KR) .................. 10-2008-0121806

(51) Int. Cl.
  *H04W 24/02* (2009.01)
(52) U.S. Cl. .................................... 370/345
(58) Field of Classification Search ............ 370/345, 370/347
  See application file for complete search history.

(56) References Cited

U.S. PATENT DOCUMENTS

| 2005/0053047 A1* | 3/2005 | Osterloh et al. ............ 370/344 |
| 2008/0130588 A1 | 6/2008 | Jeong et al. |

FOREIGN PATENT DOCUMENTS

| KR | 1020020030367 A | 4/2002 |
| KR | 1020070077022 A | 7/2007 |
| KR | 1020080013349 A | 2/2008 |
| KR | 1020080015355 A | 2/2008 |
| KR | 1020080041721 A | 5/2008 |
| KR | 1020080064748 A | 7/2008 |

OTHER PUBLICATIONS

Amitava Ghosh, et al; "Random Access Design for UMTS Air-Interface Evolution", Vehicular Technology Conference, 2007, VTC2007-Spring. IEEE 65th Apr. 22-25, 2007, pp. 1041-1045.

* cited by examiner

*Primary Examiner* — Melvin Marcelo
(74) *Attorney, Agent, or Firm* — Ladas & Parry LLP

(57) ABSTRACT

Disclosed is a hierarchical random access method for a wireless communication system having a significantly large cell. According to the present invention, a length of a preamble sequence and a length of a reference slot may be designed based on a terminal having greatest capacity of adjusting a timing error arrived at a base station, and a slot length may be designed to be an integer multiple of the length of the reference slot depending on a timing error correction capacity, thereby enabling terminals to use various slot lengths.

14 Claims, 5 Drawing Sheets

HIERARCHICAL RANDOM ACCES METHOD FOR WIRELESS COMMUNICATION SYSTEM HAVING SIGNIFICANTLY LARGE CELL

CROSS-REFERENCE TO RELATED APPLICATION

This application claims priority from Korean Patent Application No. 10-2008-0121806, filed on Dec. 3, 2008, in the Korean Intellectual Property Office, the entire disclosure of which is incorporated herein by reference.

BACKGROUND OF THE INVENTION

1. Field of the Invention

The present invention relates to a hierarchical random access method for a wireless communication system having a significantly large cell.

2. Description of Related Art

A random access method in a terrestrial mobile communication system may be based on a slotted ALOHA scheme. The random access method may be performed such that a time axis of the slotted ALOHA scheme is divided into slots, terminals are enabled to attempt a random access only where the slot starts, and when a receiver successfully receives a packet, an acknowledgement packet (ACK) is transmitted to solve a random access contention. Also, in the random access method, since the random access method does not transmit the ACK when a collision occurs, the terminals attempting the random access may wait for the ACK for a predetermined period of time, and then re-transmit the ACK when failing to receive the ACK.

The slotted ALOHA scheme may have an advantage in that a collision probability is relatively reduced in comparison with a general ALOHA scheme, and the random access method based on the slotted ALOHA scheme may be widely used in many mobile communication systems due to its simple implementation.

The random access method based on the slotted ALOHA scheme may be used in a Wideband Code Division Multiple Access (WCDMA) Universal Mobile Telecommunications System: (UMTS). Also, the random access method may enable access of terminals using 16 codes in a single arbitrary access slot.

In a case of a random access method based on a Single carrier-Frequency Division Multiple Access (SC-FDMA) scheme of a 3rd Generation Partnership Project (3GPP) Long Term Evolution (LTE) scheme, a frequency (1.08 MHz) may be allocated for a random access channel unlike a Code Division Multiple Access (CDMA) scheme, a random access slot may be periodically (period: 10 ms) allocated in the allocated frequency, and 64-numbered Constant Amplitude Zero Auto-Correlation (CAZAC) sequences for each cell may be used in the allocated slot to perform random access.

In a method of designing a preamble for random access using the CAZAC sequence, four methods may be defined based on a cell size and environment. The four methods may be given using combination of a method of adjusting a length of a Cyclic Prefix (CP) with respect to the CAZAC sequence and a method of repeating an identical CAZAC sequence.

Also, in the random access method based on the SC-FDMA scheme of 3GPP LTE scheme, there is suggested a method in which a length of the CAZAC sequence used in the preamble for random access varies depending on a user location within a single cell to thereby transmit data. Based on the length of the CAZAC sequence allocated to the cell, in a case of a user existing near a base station, a relatively short part of the allocated length of the CAZAC sequence may be used without using all of the allocated length of the CAZAC sequence. In this method, the CAZAC may be repeated based on the short length of the CAZAC sequence to thereby configure a reference CAZAC sequence allocated to the cell.

A random access method in an existing terrestrial mobile communication system may design a length of a slot for random access and a preamble for random access based on a cell size, that is, a maximum distance between a base station and a mobile station.

However, in a case where the cell size is significantly large such as in a satellite communication system, since a time difference between signals received from terminals becomes larger, the length of the slot for random access may need to be lengthened. In this case, since a path loss becomes larger according to the cell size, existing systems (including the 3GPP LTE) may enable even a length of the preamble for random access (CAZAC sequence) to be lengthened to thereby obtain a signal gain.

In this manner, when the length of the preamble is lengthened together with the length of the slot, a case where the length of the slot needs to be increasingly lengthened due to the length of the preamble that may be created. This is because the length of the slot for random access is determined by adding the length of the preamble to a timing error of signals transmitted by the terminals.

Accordingly, the length of the slot for random access is significantly lengthened in a case of a significantly large sized cell, and thus a number of terminals being connectable per hour is reduced. Also, a Random Access Channel (RACH) method designed without considering various characteristics of the terminals may disadvantageously provide an environment in which performances of the terminals capable of providing better performances are not realized.

SUMMARY OF THE INVENTION

One or more example embodiments may provide designing of a length of a preamble sequence and a length of a reference slot (transmission period) based on a terminal having a most superior capacity of adjusting a timing error arrived at a base station, and designing the length of the slot to be an integer multiple of the length of the reference slot depending on a timing error correction capacity, thereby enabling terminals to use various slot lengths.

One or more example embodiments may also provide solving inefficiency occurring when a length of a slot for RACH is lengthened in a system having, a significantly large sized cell such as in a satellite communication system, using a hierarchical Random Access Channel (RACH) structure, and efficiently performing random access of terminals.

According to an aspect of the present invention, there is provided a hierarchical random access method for a wireless communication system having a significantly large cell, the method including: setting, based on a reference terminal selected according to a performance of correcting a timing error with a base station, a length of a preamble sequence for random access of a random access terminal and a length of a reference slot being a basis for division of a slot for the random access; and configuring a length of the slot for the random access based on the length of the reference slot.

In this instance, the reference terminal may be a terminal for minimizing the timing error with the base station.

Also, the configuring may configure the length of the slot for the random access to be an integer multiple of the length of the reference slot.

Also, the method may further include applying, to all slots for the random access, the length of the preamble sequence configured based on the reference terminal.

Also, the method may further include using the set length of the preamble sequence and the set length of the reference slot in an external system linked with a system to which the random access terminal is connected.

Also, the method may further include, when a frequency bandwidth is reduced to be 1/n of the linkage with the external system, increasing the length of the preamble sequence by n times, and re-setting the length of the reference slot to correspond to the length of the preamble sequence increased by n times.

According to an aspect of the present invention, there is provided a hierarchical random access method for a wireless communication system having a significantly large cell, the method including: setting, into a receiving period of a preamble sequence for a random access, a slot length of a random access terminal free from a timing error correction capability; and receiving the preamble sequence for the random access based on the receiving period of the preamble sequence for the random access.

In this instance, the receiving may receive the preamble sequence for the random access per each receiving period using a detection window corresponding to a length of a basic slot being a basis for division of a slot.

Also, terminals, using a slot length being configured of at least two slots for the receiving period of the preamble sequence for the random access, may use a slot number for division of the slot.

According to an aspect of the present invention, there is provided a hierarchical random access method for a wireless communication system having a significantly large cell, the method including: receiving, from a base station through a broadcasting channel (BCH), system information including information for random access of a terminal; setting parameters associated with the random access; and selecting, based on the parameters, a preamble sequence of a plurality of preamble sequence groups to transmit data.

In this instance, the information for the random access of the terminal may include preamble sequence group information used depending on the slot length.

According to an aspect of the present invention, there is provided a hierarchical random access method for a wireless communication system having a significantly large cell, the method including: determining whether a number of terminals using a length of a presently used slot exceeds a predetermined number when re-transmitting a preamble for random access; and changing the length of the presently used slot to re-transmit the preamble for random access using the presently used slot having a changed length when the number of terminals exceeds the predetermined number.

In this instance, the changing of the length of the presently used slot may include: determining whether a slot for random access exists, the slot being used by another terminal having a timing correction capacity lower than that of the terminal; determining whether a use of the slot corresponding to the length of the slot for random access exceeds a predetermined use frequency when the slot for random access is determined to exist; and changing the length of the slot for random access to re-transmit the preamble for random access using the slot having a changed length when the use of the slot exceeds the predetermined use frequency.

Also, the changing of the length of the slot may include setting a backoff time to 0 ms to re-transmit the preamble for random access.

According to an aspect of the present invention, there is provided a hierarchical random access method for a wireless communication system having a significantly large cell, the method including: transmitting a preamble for random access by a terminal performing random access; maintaining a power-saving mode until an operation time of a receiving window in accordance with the transmission of the preamble after transmitting the preamble for random access; and receiving a random access result through the receiving window.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
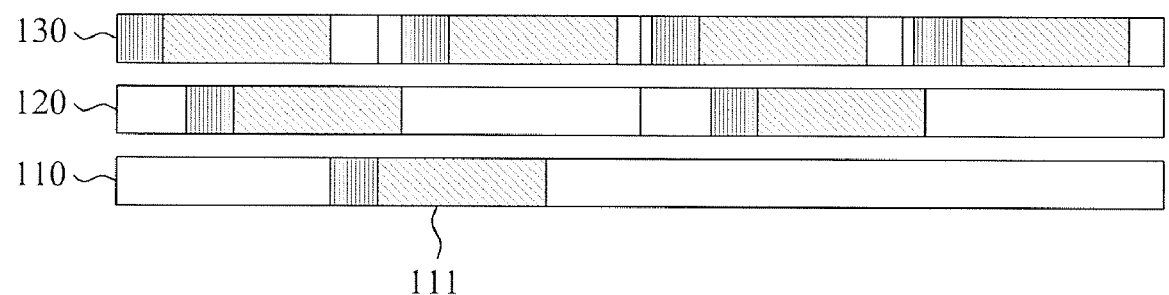
FIG. 1 illustrates a structure of a hierarchical Random Access Channel (RACH) according to example embodiments.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates a structure of a hierarchical Random Access Channel (RACH) according to example embodiments.

A base station may set, based on a reference terminal selected according to a performance of correcting a timing error with the base station, a length of a preamble sequence for random access of a random access terminal and a length of a reference slot being a basis for division of a slot for the random access, and configure a length of the slot for the random access based on the length of the reference slot.

In this instance, the reference terminal may designate a terminal in which a timing error with the base station is minimized.

Also, the length of the slot for the random access may be configured to be an integer multiple of the length of the reference slot.

As illustrated in FIG. 1, when a length of an RACH slot is significantly lengthened due to a significantly large cell, a hierarchical RACH structure may be used depending on a capacity of a terminal.

A first slot 110 of FIG. 1 is an RACH slot used by terminals free from a timing error correction capacity. Also, second and third slots 120 and 130 may be divided into the RACH slot used by the terminals free from the timing error correction capacity using the timing error correction capacity. Specifically, the second and third slots 120 and 130 may be divided into two RACH slots and four RACH slots, respectively.

In a case of the above described structure, a random access time may be reduced and a random access probability may be increased depending on the capacity of the terminals. Specifically, relatively more RACH slots may be allocated as compared with using only a single slot, whereby more random access probabilities are provided to the terminal for an identical period of time.

Even though the slots are divided as illustrated in FIG. 1, the slots are used in an identical frequency band, and thus the slots having different lengths are simultaneously used while being overlapped.

The above described hierarchical RACH structure may not allocate different bandwidths for each layer, and divide only a slot length in a single bandwidth, so that an overall preamble sequence 111 allocated to the RACH is allocated for each layer, thereby enabling a sequence used for each layer to differ to each other.

In general, since a signal attenuation in transmitting a signal to the base station increases along with an increase in a size of a cell, the length of the preamble sequence may be lengthened to increase a power gain. However, when the length of the preamble sequence is lengthened, the slot length needs to be designed considering a time receiving all preamble sequences, and thus the slot length is lengthened.

The length of the preamble sequence may be allocated based on the slot length, and may be applicable on a slot for the random access.

In a case where a delay time between signals received from the terminals is large such as in a satellite communication system, when the length of the preamble sequence is lengthened, the slot length is significantly lengthened, resulting in an inefficient structure.

Accordingly, when the structure of the hierarchical RACH of FIG. 1 is used, power allocation and power control may be performed based on distance attenuation in accordance with the size of the cell, thereby compensating deterioration in the power gain occurring due to a short length of the preamble sequence.

Figure 2:
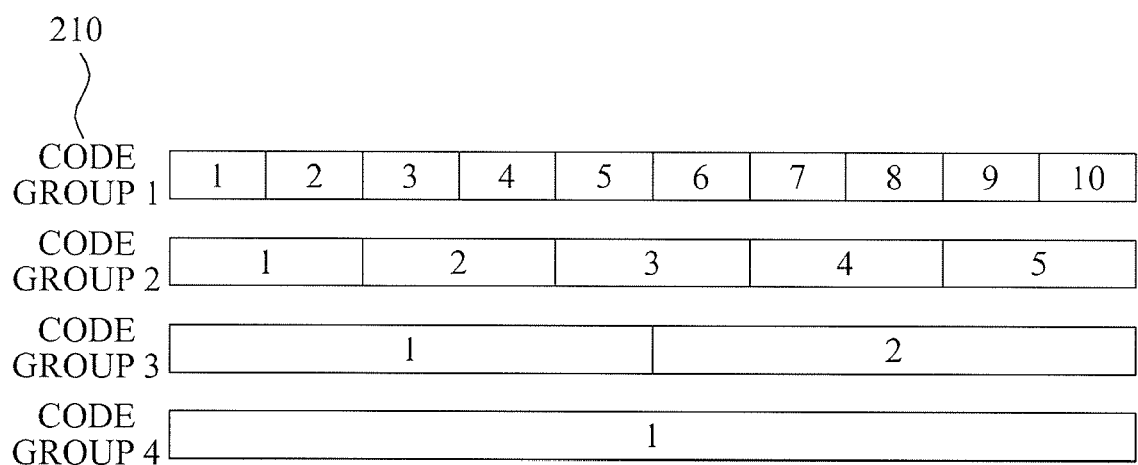
FIG. 2 illustrates an example in which a number is allocated to a slot in a hierarchical RACH structure for the purpose of a random access response according to example embodiments.

FIG. 2 illustrates an example in which a number is allocated to a slot in a hierarchical RACH structure for the purpose of a random access response according to example embodiments.

Terminals may hierarchically perform transmission according to the timing error correction capacity of the terminals, however, an RACH preamble of all hierarchies needs to be detected through a single signal in a reception end.

Accordingly, a detection operation may be performed after receiving a single slot based on the terminal free from the timing error correction capacity. Thus, other slots except for the slot being a basis for division of the slot for the random access may be utilized for random access several times for the reference slot, and a case where an identical preamble is used during several random access may be created.

In this case, in order to divide terminals transmitting the identical preamble, a slot number may be allocated to the random access slot in the same type as illustrated in FIG. 2.

In FIG. 2, when detecting the preamble, a detection window may be configured by a number of slots of a layer 210 having a shortest slot length to thereby detect the preamble.

Since all structures of the hierarchical RACH and preamble sequence information allocated for each layer are known in a receiver, when attempting the detection while moving the detection window, a number of preamble sequences that needs to be checked for detection for each section may be advantageously reduced.

For example, in a case of the detection window in slot (1) of a layer 210 having a shortest slot length, a preamble sequence code of the layer using the shortest slot length may attempt detection only in a section ranging from a start point of slot (1) to a maximum delay time (generally, a cyclic prefix length), and then only detection with respect to a preamble sequence code allocated to another layer may be attempted in a following section.

Figure 3:
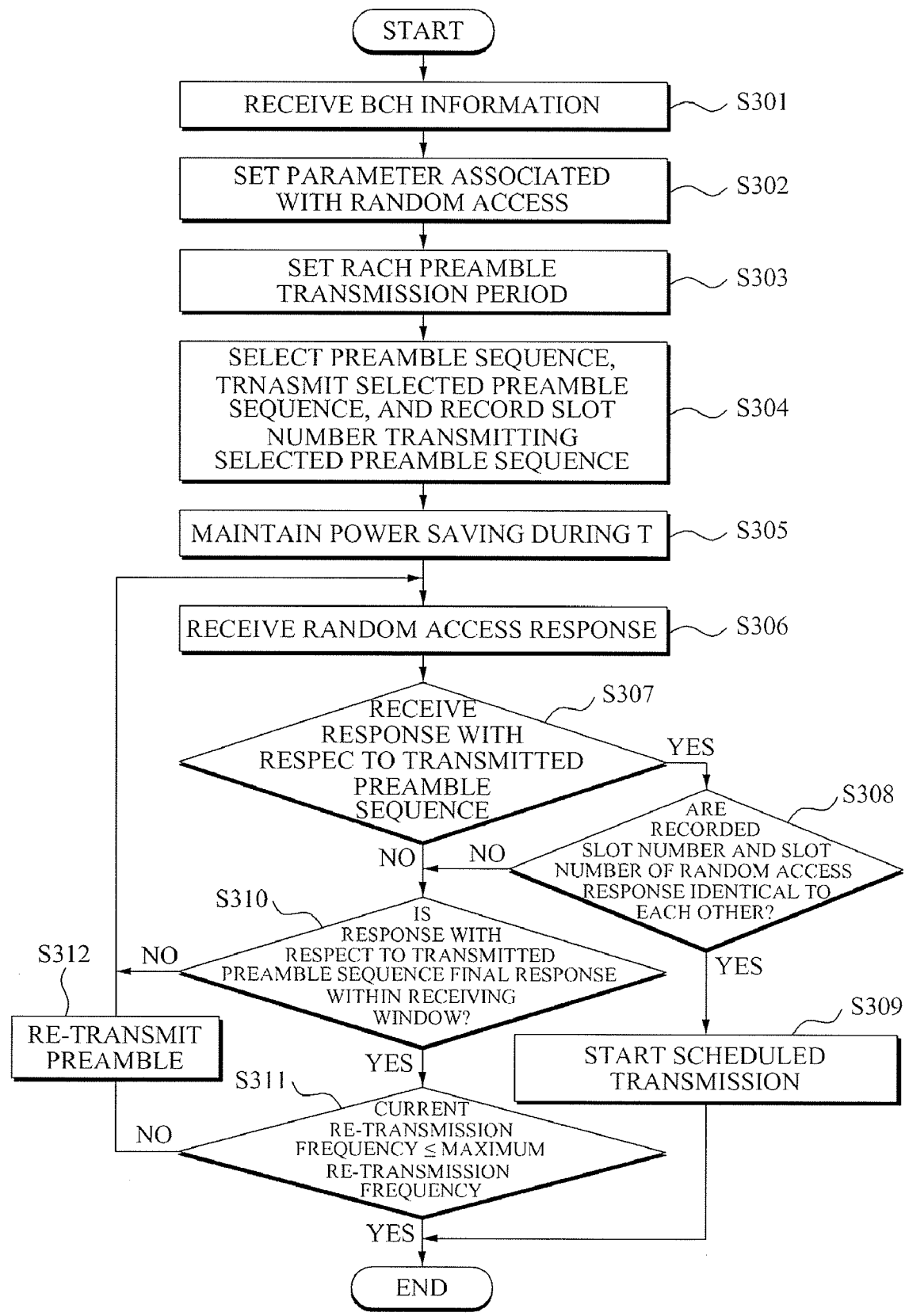
FIG. 3 is a flowchart illustrating operations of a terminal using a hierarchical RACH structure according to example embodiments.

FIG. 3 is a flowchart illustrating operations of a terminal using a hierarchical RACH structure according to example embodiments.

In operation S301, the terminal may receive system information from a system (base station) through a Broadcasting Channel (BCH).

In this instance, the system information may include information for random access of the terminal, that is, a sequence group of the preamble, and information about a slot start timing.

In operation S302, the terminal may set basic parameters associated with the random access.

In operation S303, the terminal may set a transmission period (slot length) of a preamble of an RACH, the RACH capable of connecting with the terminal, according to a timing error correction capacity of the terminal.

In operation S304, the terminal may select an arbitrary sequence from among a preamble sequence group allocated to a transmission timing of the terminal, transmit the selected sequence, and record the transmitted slot information (number).

In operation S305, the terminal may convert to a power saving mode for T in which an arbitrary access response is returned. In this instance, T may be used in a case of a relatively long reciprocating delay time.

In operation S306, the terminal may receive the random access response.

In operation S307, the terminal may determine whether the received random access response is a response with respect to the transmitted preamble sequence.

In operation S308, when the received random access response is the response with respect to the transmitted preamble sequence, the terminal may determine whether the recorded slot number and a slot number of the random access response are identical to each other.

In operation S309, when the recorded slot number and the slot number of the random access response are identical to each other, a scheduled transmission may be started.

In operation S310, when the received random access response is not the response with respect to the transmitted preamble sequence, the terminal may determine whether the response with respect to the transmitted preamble sequence is a final response within a receiving window. In operation S311, when the response with respect to the transmitted preamble sequence is the final response within the receiving window, the terminal may determine whether a current re-transmission frequency is greater than a maximum re-transmission frequency. When the current re-transmission frequency is greater than the maximum re-transmission frequency, the terminal may terminate all operations.

In operation S312, when the current re-transmission frequency is not greater than the maximum re-transmission frequency, the terminal may re-transmit the preamble.

Figure 4:
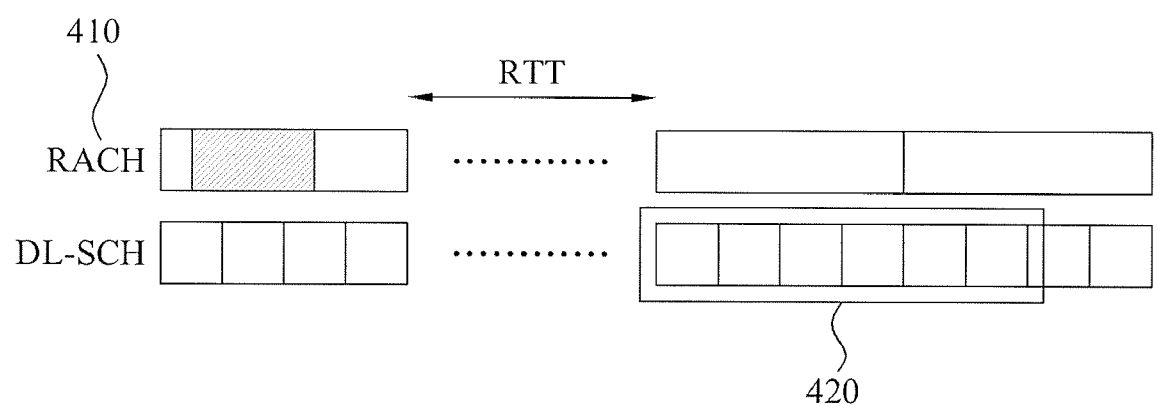
FIG. 4 illustrates an example of a receiving window used for receiving a random access response in a terminal according to example embodiments.

FIG. 4 illustrates an example of a receiving window used for receiving a random access response in a terminal according to example embodiments.

As illustrated in FIG. 4, a terminal may transmit a preamble through an RACH 410, and a receiving window may wait for a reciprocating delay time, and then determine whether to receive response information and how much response information to receive.

In general, a reception end may use the above described method due to occurrence of a data processing time and random delay time.

Figure 5:
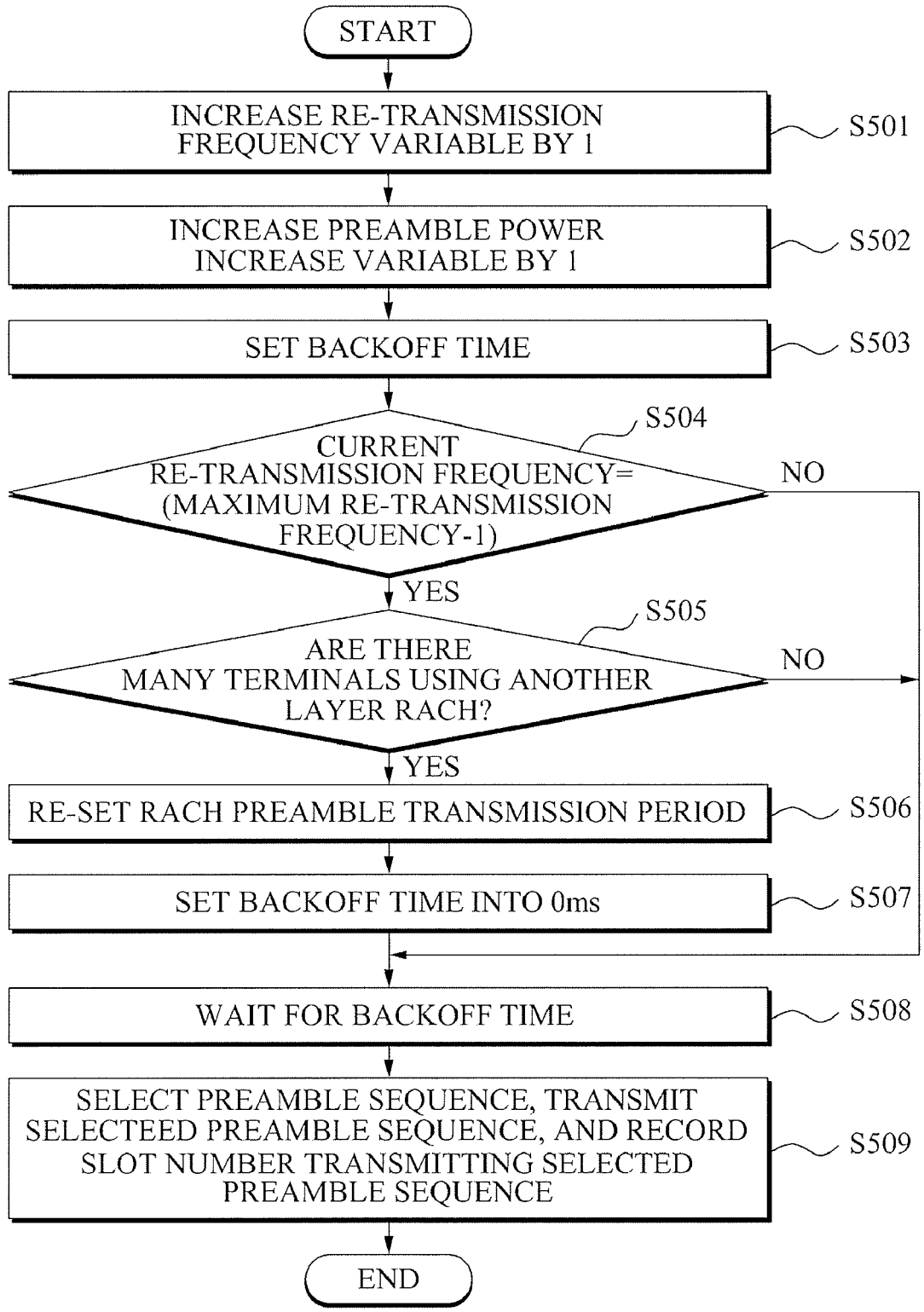
FIG. 5 is a flowchart illustrating a preamble-retransmission operation of a terminal using a hierarchical RACH structure according to example embodiments.

FIG. 5 is a flowchart illustrating a preamble-retransmission operation of a terminal using a hierarchical RACH structure according to example embodiments.

In operation S501, the terminal may increase a preamble re-transmission frequency variable by 1.

In operation S502, the terminal may increase a preamble power increase variable by 1.

In operation S503, the terminal may set a backoff time.

In operation S504, the terminal may determine whether a current re-transmission frequency is identical to a frequency obtained by subtracting 1 from a maximum re-transmission frequency (the maximum re-transmission frequency−1). In operation S505, when the current re-transmission frequency is identical to the frequency obtained by subtracting 1 from the maximum re-transmission frequency, the terminal may determine whether there are many terminals using another layer RACH.

In operation S508, when the current re-transmission frequency is not identical to the frequency obtained by subtracting 1 from the maximum re-transmission frequency, the terminal may wait for a backoff time.

In this instance, determining whether there are many terminals using a transmission period (slot length) used in a previous transmission when comparing the maximum re-transmission frequency and the current re-transmission frequency may merely be an example, and thus various types may be used.

Also, a determining of whether there are many terminals using the other layer RACH may be determined by a system operator based on a number of sequence code allocations.

In operation S506, when there are not many terminals using the other layer RACH, the terminal may re-transmit an RACH preamble transmission period to use a layer RACH not frequently used.

In operation S507, the terminal may set a backoff into '0' ms.

In operation S508, the terminal may wait for a backoff time.

In operation S509, the terminal may randomly select a preamble from among preamble sequences allocated to a corresponding RACH layer, transmit the selected preamble, and record transmission slot information (number).

As described above, according to the present invention, a length of a preamble sequence and a length of a reference slot (transmission period) may be designed based on a terminal having greatest the best capacity of adjusting a timing error arrived at a base station, and the length of the slot may be designed to be an integer multiple of the length of the reference slot depending on a timing error correction capacity, thereby enabling terminals to use various slot lengths.

According to the present invention, inefficiency occurring when a length of a slot for RACH is lengthened in a system having a significantly large cell such as a satellite communication system may be solved using a hierarchical Random Access Channel (RACH) structure, and random access of terminals may be effectively performed.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A hierarchical random access method for a wireless communication system having a significantly large cell, the method comprising:
    setting, based on a reference terminal selected according to a performance of correcting a timing error with a base station, a length of a preamble sequence for random access of a random access terminal and a length of a reference slot being a basis for division of a slot for the random access; and
    configuring a length of the slot for the random access based on the length of the reference slot.

2. The method of claim 1, wherein the reference terminal is a terminal for minimizing the timing error with the base station.

3. The method of claim 1, wherein the configuring configures the length of the slot for the random access to be an integer multiple of the length of the reference slot.

4. The method of claim 1, further comprising:
    applying, to all slots for the random access, the length of the preamble sequence configured based on the reference terminal.

5. The method of claim 1, further comprising:
    using the set length of the preamble sequence and the set length of the reference slot in an external system linked with a system to which the random access terminal is connected.

6. The method of claim 5, further comprising:
    when a frequency bandwidth is reduced to be 1/n of the linkage with the external system,
    increasing the length of the preamble sequence by n times, and re-setting the length of the reference slot to correspond to the length of the preamble sequence increased by n times.

7. A hierarchical random access method for a wireless communication system having a significantly large cell, the method comprising:
    setting, into a receiving period of a preamble sequence for a random access, a slot length of a random access terminal free from a timing error correction capability; and
    receiving the preamble sequence for the random access based on the receiving period of the preamble sequence for the random access.

8. The method of claim 7, wherein the receiving receives the preamble sequence for the random access per each receiving period using a detection window corresponding to a length of a basic slot being a basis for division of a slot.

9. The method of claim 7, wherein terminals, using a slot length being configured of at least two slots for the receiving period of the preamble sequence for the random access, uses a slot number for division of the slot.

10. A hierarchical random access method for a wireless communication system having a significantly large cell, the method comprising:
    determining whether a number of terminals using a length of a presently used slot exceeds a predetermined number when re-transmitting a preamble for random access; and
    changing the length of the presently used slot to re-transmit the preamble for random access using the presently used slot having a changed length when the number of terminals exceeds the predetermined number.

11. The method of claim 10, wherein the changing of the length of the presently used slot includes:

determining whether a slot for random access exists, the slot being used by another terminal having a timing correction capacity lower than that of the terminal;

determining whether a use of the slot corresponding to the length of the slot for random access exceeds a predetermined use frequency when the slot for random access is determined to exist; and changing the length of the slot for random access to re-transmit the preamble for random access using the slot having a changed length when the use of the slot exceeds the predetermined use frequency.

12. The method of claim 11, wherein the changing of the length of the slot includes setting a backoff time to 0 ms to re-transmit the preamble for random access.

13. A hierarchical random access method for a wireless communication system having a significantly large cell, the method comprising:

receiving, from a base station through a broadcasting channel (BCH), system information including information for random access of a terminal;

setting parameters associated with the random access; and selecting, based on the parameters, a preamble sequence of a plurality of preamble sequence groups to transmit data, wherein the parameters include a slot length of a preamble of a slot for transmitting the data, and wherein the slot length is determined according to a timing error correction capacity of the terminal.

14. The method of claim 13, wherein the information for the random access of the terminal includes preamble sequence group information used depending on the slot length.

* * * * *